Nov. 10, 1959     M. FRACHON     2,912,530
CONTROL SWITCHES
Filed Oct. 15, 1957
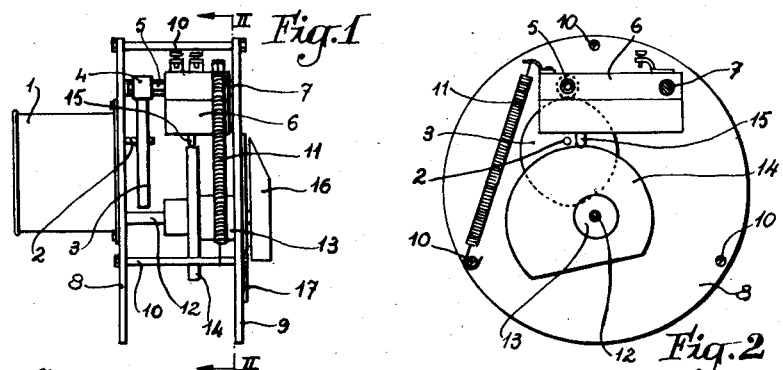
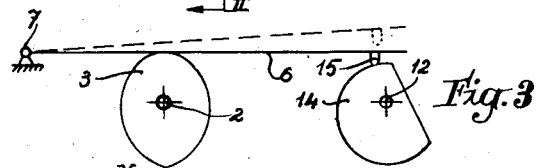
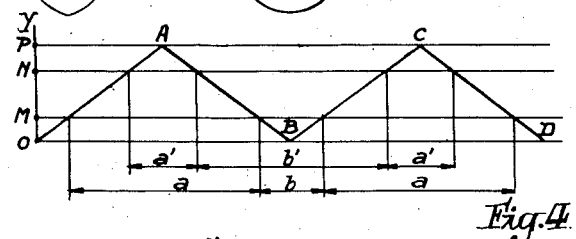
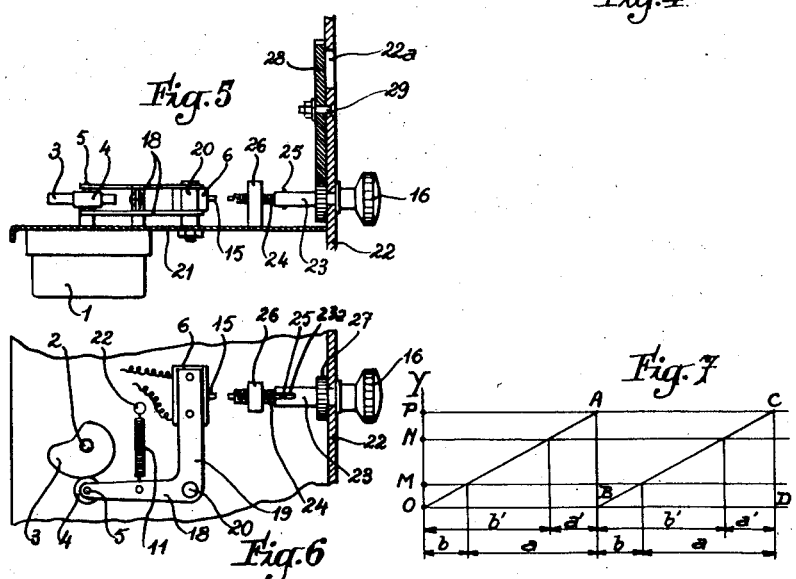
INVENTOR.
Marc Frachon

United States Patent Office 2,912,530
Patented Nov. 10, 1959

2,912,530

CONTROL SWITCHES

Marc Frachon, Saint-Genis-Laval, France

Application October 15, 1957, Serial No. 690,361

Claims priority, application France October 22, 1956

3 Claims. (Cl. 200—31)

This invention relates to electric control switches of the type adapted to control the mean power supplied to an electric circuit and more particularly to an electric heating device.

Switches of this type are known wherein the power control is effected by intermittently interrupting heating or like circuits, the adjustment being obtained by varying the relative importance of the active periods during which the switch is "on," with respect to the dead periods during which the said switch is "off." Such a method, which may be termed a cyclic interruption, may be carried into practice whenever the action of the controlled apparatus or element is relatively slow and involves a substantial inertia. This method has been used for the control of the field magnets in electric machines, the successive periods being very short in order that the magnetic flux may remain practically constant. The said method is commonly used in connection with electrical heating apparatus wherein the thermic inertia is such that even with relatively long active and dead periods the resulting temperature variations are wholly negligible.

An object of this invention is to provide a cyclic control switch of very simple construction, of low cost and perfectly safe in operation.

In accordance with this invention a cyclic control switch comprises a constant speed driving motor, such as a small synchronous electric motor, a driving cam rotated by the said motor, a micro-switch unit pivotally mounted about a fixed point and oscillated by the said driving cam against the action of a spring, and a regulating abutment disposed in front of the operating button of the said micro-switch unit to actuate the said button when the micro-switch unit is moving towards one of the end positions of its stroke.

It will be easily appreciated that when the button of the micro-switch unit engages the regulating abutment, the movement of the said button is stopped and since the unit goes on moving, the button is pushed with respect to the unit itself. The micro-switch is therefore actuated, for instance for interrupting the circuit which it controls, until the movement of the said unit is reversed, the button then becoming disengaged from the regulating abutment. There is thus obtained a succession of active periods and of dead periods in the operation of the electric apparatus which the micro-switch controls either directly or through appropriate relays and the ratio of the active periods with respect to the dead periods may be varied at will by displacing the regulating abutment. The apparatus only comprises a small number of parts which are simple in construction and inexpensive to produce.

In a first embodiment of this invention the regulating abutment is in the form of a cam member which is normally stationary during operation of the switch, but which may be rotated at will by the operator for regulating purposes. In another embodiment the said abutment is formed by the end of an adjusting screw actuated by means of an appropriate knob. In both cases there is preferably provided a dial or like means adapted to indicate the position of the regulating abutment.

In the annexed drawings:

Fig. 1 is a side view of a control switch according to this invention.

Fig. 2 is a section thereof taken through line II—II of Fig. 1.

Fig. 3 is a diagrammatical view adapted to illustrate the operation of the switch.

Fig. 4 is the diagram corresponding to this operation.

Fig. 5 is a side view of another embodiment of this invention.

Fig. 6 is the corresponding plan view.

Fig. 7 is the operating diagram of the control switch according to this second embodiment of the invention.

In the first embodiment of Figs. 1 and 2 the control switch comprises a small constant speed electric motor 1, such as a synchronous motor with an incorporated speed-reducing gearing adapted to ensure a low rotational speed of the outlet shaft 2, as for instance one rotation per 1 to 5 minutes. Shaft 2 carries a cam 3 formed of two symmetrically disposed spiral arcs, which actuates a follower roller 4 loosely supported by a pin 5 solid with the casing of a micro-switch unit 6. This micro-switch may be for instance of the type comprising spring blades ensuring a snap action. The micro-switch unit 6 is pivotally supported by a gudgeon 7 substantially disposed near the other side of unit 6 with respect to pin 5, the said gudgeon being carried by two supporting plates 8 and 9 connected with each other by means of intermediate stays 10, plate 8 being further adapted to support the driving motor 1. A loading spring 11 acts on the micro-switch unit 6 for maintaining the follower roller 4 in engagement with the driving cam 3.

Plates 8 and 9 rotatably carry a shaft 12 which may rotate with a substantial friction (this being for instance obtained by means of a plastic washer 13). Shaft 12 carries a cam 14 so arranged as to be disposed in the vertical plane of the actuating button 15 of the micro-switch unit 6. In the specific example illustrated the frictional washer 13 is inserted between the above-mentioned cam 14 and the adjacent supporting plate 9. The outer end of shaft 12 carries an actuating knob 16 which moves in front of a dial 17 secured on the outer side of plate 9.

The diagrammatical illustration of Fig. 3 clearly shows the operation of the switch: When the small motor 1 is in operation the driving cam 3 oscillates vertically the micro-switch unit 6 about the axis of gudgeon 7. In Fig. 3 the micro-switch unit 6 has been illustrated in the form of a mere straight line and it has further been supposed that this straight line was in direct engagement with the driving cam 3, which does not modify the general operation of the apparatus. The button 15 of the micro-switch of course oscillates together with unit 6 itself. When the latter moves downwardly, the actuating button 15 comes into engagement with the periphery of the regulating cam 14, whereby its movement is stopped. As the micro-switch unit 6 moves down further, button 15 is pushed with respect to the said unit as if it were positively pressed with respect to a stationary switch casing. The micro-switch is therefore actuated and it opens its inner circuit. When the micro-switch unit 6 moves upwardly the said circuit is again closed, etc. The duration of the period during which the switch is open may be regulated at will by rotating cam 14 by means of knob 16.

In the diagram of Fig. 4 the abscissae correspond to the time while the ordinates represent the vertical displacement of a point of the micro-switch unit 6, as for instance of a point situated in the immediate vicinity of the actuating button 15 thereof. If the two arcs of the driving cam 3 are in the form of true arithmetic spirals, the motion of unit 6 is illustrated by the regular broken line OABCD, etc. For a given adjustment of the regulating cam 14, as illustrated by point M, the circuit controlled by the micro-switch is closed when unit 6 is above the horizontal line M (periods *a*) and it is on the other hand open when the said casing is below line M (periods *b*). When cam 14 is angularly displaced, the ratio of *a* to *b* varies, the corresponding periods varying in opposite directions. Thus with the adjustment of cam 14 as illustrated by horizontal line N, periods *a* and *b* become *a'* and *b'*. Cam 14 could be so arranged that it may be possible to reach the end points O and P, the first one corresponding to the controlled circuit being permanently closed and the second one to the said circuit being permanently open. It will be noted in this respect that when cam 14 is disposed with its large radii in front of button 15, it may occur that the said cam retains the micro-switch unit 6 itself against the action of spring 11, the cam follower 4 then being out of engagement with respect to the driving cam 3. This is however without any inconvenience since owing to the slow rotational speed of cam 3, roller 4 re-engages cam 3 almost progressively without any noticeable shock.

In the embodiment of Figs. 5 and 6 the driving cam 3 is in the form of a single arc of a spiral with a sharp radial connecting portion. The pin 5 which forms the pivot of the cam-follower roller 4 associated to cam 3 is carried by the outer end of one arm 18 of a bell-cranked lever 18—19 pivoted at 20 on a horizontal supporting plate 21. The loading spring 11 is directly attached at one end to the aforesaid arm 18 and at its other end to a pin 22 carried by plate 21. The micro-switch unit 6 is carried by the outer end of arm 19.

The apparatus further comprises a vertical front wall 22 which carries the adjusting knob 16, the shaft of which is solid with a sleeve 23 in which there is slidably disposed a screw-threaded rod 24. Rod 24 is formed with a transverse pin 25 the ends of which are passed through two longitudinal slots 23a of sleeve 23, the said rod being besides screwed in a blocked 26 carried by plate 21 in such a manner that its free end is situated just in front of the actuating button 15 of the micro-switch unit 6.

The shaft of the adjusting knob 16 also carries a pinion 27 disposed against the inner side of wall 22 and which meshes with a toothed disc 28 made of a transparent plastic material which rotates on a pin 29 supported by the said wall 22. Disc 28 carries an appropriate scale which appears in front of a window 22a provided in wall 22.

It will be appreciated that the operation remains substantially the same as with the first above-described embodiment. The driving cam 3 oscillates regularly the micro-switch unit 6, the free end of rod 24 forming an adjustable abutment, as the regulating cam 14 of the first embodiment, for limiting the return movement of the micro-switch under the action of spring 11 by engaging the end of the actuating button 15 of the micro-switch. The diagram of operation is illustrated in Fig. 7 wherein the same references have been used as in the diagram of Fig. 4. Owing to the vertical position of the portion AB of the diagram, periods *a*, *a'*, etc. always terminate at the end of an operating cycle, i.e. at points B, D, etc.

The speed of the driving shaft 2 may of course vary according to the type of apparatus or equipment to be controlled. The contour of the driving cam 3 may be varied as desired. Although it is generally convenient that the button 15 of the micro-switch be actuated by the regulating adjustment 14, respectively 24, during the return of the said unit under the action of spring 11, since with this particular arrangement the micro-switch unit may be retained by the said abutment, the disposition could also be such that the said button 15 be actuated by the driving cam 3 when the latter oscillates unit 6, the regulating abutment then being adapted to engage the unit itself during the return movement thereof to disengage the actuating button 15 from the periphery of the driving cam 3.

I claim:
1. A cyclic control switch comprising a support; a continuously oscillating micro-switch unit pivotally carried by said support, said micro-switch unit embodying an actuating press-button and inner snap-action contacts actuated by said press-button; a normally stationary but adjustable regulating abutment carried by said support to cooperate with the press-button of said micro-switch unit at each alternate oscillation thereof; returning means to urge said micro-switch unit towards said adjustable regulating abutment to cause same to limit the returning stroke of said micro-switch unit by engagement with said press-button; a continuously rotating driving cam rotatably carried by said support and acting on said micro-switch unit against the action of said returning means to oscillate said micro-switch unit and to disengage said press-button from said regulating abutment at each alternate oscillation of said unit; and a continuously rotating constant speed motor carried by said support to rotate said driving cam.

2. A cyclic control switch comprising a support; a continuously rotating constant speed motor unit carried by said support, said unit having a low speed outlet shaft; a driving cam carried by said outlet shaft to be continuously rotated thereby; a bracket pivotally carried by said support to cooperate with said driving cam and to be continuously oscillated thereby; spring means acting on said bracket to maintain same in engagement with said driving cam; a micro-switch unit secured on said bracket, said micro-switch unit embodying an actuating press-button and inner snap action contacts actuated by said press-button; and a normally stationary but adjustable regulating abutment disposed on said support in front of said actuating press-button, said abutment and said press-button being so arranged that said press-button engages said abutment during each return stroke of said bracket under the action of said spring means to cause actuation of said inner snap-action contacts during an adjustable portion of each operative cycle of the control switch.

3. A cyclic control switch comprising a support; a continuously oscillating micro-switch unit pivotally carried by said support, said micro-switch unit embodying an actuating press-button and inner snap-action contacts actuated by said press-button; a normally stationary, but manually rotatable regulating cam member carried by said support to co-operate with the press-button of said micro-switch unit at each alternate oscillation thereof; returning means to urge said micro-switch unit towards said regulating cam member to cause same to limit the returning stroke of said micro-switch unit by engagement with said press-button; a continuously rotating driving cam rotatably carried by said support and acting on said micro-switch unit against the action of said returning means to oscillate said micro-switch unit and to disengage said press-button from said regulating cam member at each oscillation of said unit; and a continuously rotating constant speed motor carried by said support to rotate said driving cam.

References Cited in the file of this patent
UNITED STATES PATENTS

| | | |
|---|---|---|
| Re. 20,570 | Bushway | Dec. 7, 1937 |
| 2,578,632 | Miller | Dec. 11, 1951 |
| 2,633,914 | Miller | Apr. 7, 1953 |
| 2,653,196 | Cockman | Sept. 22, 1953 |
| 2,785,256 | Nina | Mar. 12, 1957 |
| 2,838,646 | Welsh | June 10, 1958 |
| 2,853,567 | Kock | Sept. 23, 1958 |

FOREIGN PATENTS

| | | |
|---|---|---|
| 900,567 | France | Oct. 9, 1944 |
| 1,103,986 | France | June 1, 1955 |